United States Patent
Kim et al.

(10) Patent No.: US 9,544,919 B2
(45) Date of Patent: Jan. 10, 2017

(54) METHOD AND APPARATUS FOR TRANSMITTING AND RECEIVING UPLINK RANDOM ACCESS CHANNEL SLOT IN A WIRELESS COMMUNICATION SYSTEM USING BEAMFORMING

(71) Applicant: Samsung Electronics Co., Ltd., Suwon-si, Gyeonggi-do (KR)

(72) Inventors: Yung-Soo Kim, Seongnam-si (KR); Hyun-Il Yoo, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/197,734

(22) Filed: Mar. 5, 2014

(65) Prior Publication Data
US 2014/0254515 A1    Sep. 11, 2014

(30) Foreign Application Priority Data

Mar. 6, 2013  (KR) .................. 10-2013-0023822

(51) Int. Cl.
| | |
|---|---|
| H04B 7/06 | (2006.01) |
| H04W 74/08 | (2009.01) |
| H04B 7/08 | (2006.01) |
| H04B 7/185 | (2006.01) |

(52) U.S. Cl.
CPC ....... *H04W 74/0833* (2013.01); *H04B 7/0617* (2013.01); *H04B 7/0695* (2013.01); *H04B 7/088* (2013.01); *H04B 7/18532* (2013.01)

(58) Field of Classification Search
CPC . H04B 7/0617; H04B 7/0695; H04B 7/18532; H04W 56/00
See application file for complete search history.

(56) References Cited

U.S. PATENT DOCUMENTS

| | | | |
|---|---|---|---|
| 6,233,466 B1 | 5/2001 | Wong et al. | |
| 6,768,913 B1* | 7/2004 | Molnar | H04B 7/18532 455/273 |
| 7,444,157 B2* | 10/2008 | Hovers | H04B 7/061 342/368 |
| 8,165,097 B2 | 4/2012 | Yi et al. | |
| 2005/0018754 A1* | 1/2005 | Song | H04B 1/707 375/142 |
| 2007/0119948 A1* | 5/2007 | Mitelman | G06K 7/10851 235/462.48 |

(Continued)

FOREIGN PATENT DOCUMENTS

| | | |
|---|---|---|
| KR | 10-2014-0004513 A | 1/2014 |
| WO | 2010-145929 A1 | 12/2010 |
| WO | 2013/039355 A2 | 3/2013 |

*Primary Examiner* — Raj Jain
(74) *Attorney, Agent, or Firm* — Jefferson IP Law, LLP

(57) ABSTRACT

A method and apparatus for transmitting and receiving a signal of Random Access Channel (RACH) in a wireless communication system using beamforming are provided. The reception method includes receiving the signal through each transmission beam of a transmitter from a transmitter, transmitted in each transmission beam by the transmitter, the signal including as many repeated symbols as a total number of reception beams of a receiver, and detecting symbols by switching to reception beams corresponding to the symbols included in the signal during reception of the signal.

20 Claims, 12 Drawing Sheets

(56) References Cited

U.S. PATENT DOCUMENTS

| | | | |
|---|---|---|---|
| 2008/0151831 A1* | 6/2008 | Khan | H04L 1/0656 370/330 |
| 2009/0175161 A1 | 7/2009 | Yi et al. | |
| 2009/0201902 A1* | 8/2009 | Miki | H04W 88/08 370/342 |
| 2009/0280867 A1 | 11/2009 | Hovers et al. | |
| 2011/0007715 A1* | 1/2011 | Kwon | H04J 13/00 370/335 |
| 2012/0052897 A1 | 3/2012 | Senarath et al. | |
| 2013/0235851 A1* | 9/2013 | Abu-Surra | H04W 56/00 370/336 |
| 2014/0010178 A1 | 1/2014 | Yu et al. | |
| 2014/0185539 A1* | 7/2014 | Seo | H04B 7/2656 370/329 |

* cited by examiner

METHOD AND APPARATUS FOR TRANSMITTING AND RECEIVING UPLINK RANDOM ACCESS CHANNEL SLOT IN A WIRELESS COMMUNICATION SYSTEM USING BEAMFORMING

CROSS-REFERENCE TO RELATED APPLICATION(S)

This application claims the benefit under 35 U.S.C. §119 (a) of a Korean patent application filed on Mar. 6, 2013 in the Korean Intellectual Property Office and assigned Serial number 10-2013-0023822, the entire disclosure of which is hereby incorporated by reference.

TECHNICAL FIELD

The present disclosure relates to a method and apparatus for transmitting and receiving a random access channel slot in a wireless communication system that performs beamforming through multiple antennas.

BACKGROUND

In order to satisfy ever-increasing demands for wireless data traffic, techniques for increasing data rate in a wireless communication system have been proposed. One of the techniques is to increase the bandwidth of a signal. Because securing a broad frequency band in a bandwidth of 10 GHz or below in a general wireless communication system is difficult, a broad frequency should be secured in a higher frequency band. In this context, short-range communication standards in the current 60-GHz frequency band, such as Wireless High Definition (WirelessHD), Institute of Electrical and Electronics Engineers (IEEE) 802.15.3c, IEEE 802.11ad, and the like are under active study for millimeter wave communication systems.

As a result of the use of an extremely high frequency, a millimeter wave communication system suffers from path loss, poor penetration characteristics, and thus a reduction of service coverage. Such problems may be solved by beamforming. Specifically, narrow beam-based beamforming restricts Doppler spread and multi-path components.

Beamforming focuses waves on a specific service area by steering (e.g., directing) signals from a plurality of antennas in a specific direction. Beamforming may include Transmission (Tx) beamforming and Reception (Rx) beamforming. In Tx beamforming, almost no signal is transmitted in directions other than an intended direction. In contrast, in Rx beamforming, almost no signal is received from directions other than an intended direction. For the Tx beamforming and the Rx beamforming, a transmitter and a receiver may need to detect respective best Tx and Rx beams that have highest signal strengths by sequentially steering beams in specific directions.

Meanwhile, when a Mobile Station (MS) initially accesses a Base Station (BS) or performs handover to the BS, the MS performs a Random Access (RA) procedure. The process of detecting best Tx and Rx beams may be performed during the RA procedure. Accordingly, RA is delayed by a time taken to detect the best Tx and Rx beams.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an Uplink (UL) Random Access Channel (RACH) slot structure that minimizes a time delay involved in detecting best Transmission (Tx) and Reception (Rx) beams during Random Access (RA).

Another aspect of the present disclosure is to provide a method and apparatus for transmitting and receiving a UL RACH slot.

In accordance with an aspect of the present disclosure, a method for receiving a signal of the RACH in a wireless communication system using beamforming is provided. The method includes receiving the signal through each transmission beam of a transmitter from the transmitter, and detecting symbols by switching to reception beams corresponding to the symbols included in the signal during reception of the RACH signal.

In accordance with another aspect of the present disclosure, a receiver for receiving a signal of a RACH in a wireless communication system using beamforming is provided. The receiver includes a transceiver configured to receive the signal through each transmission beam of a transmitter from a transmitter, and a controller configured to detect symbols included in the signal by switching to reception beams corresponding to the symbols during reception of the RACH signal.

In accordance with another aspect of the present disclosure, a method for transmitting an RACH signal in a wireless communication system using beamforming is provided. The method includes generating an RACH signal including repeated symbols corresponding to reception beams of a receiver, and transmitting the RACH signal to the receiver by each transmission beam.

In accordance with another aspect of the present disclosure, a transmitter for transmitting an RACH signal in a wireless communication system using beamforming is provided. The transmitter includes a controller configured to generate an RACH signal including repeated symbols corresponding to reception beams of a receiver, and a transceiver configured to transmit the RACH signal to the receiver by each transmission beam.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
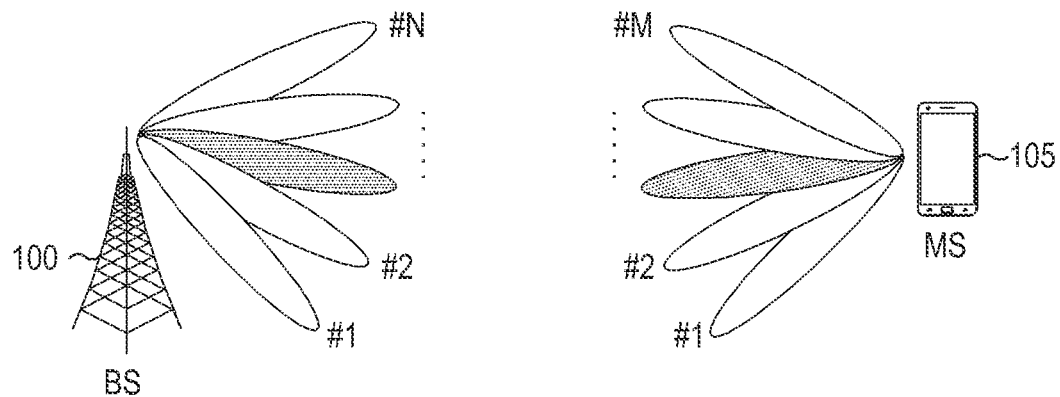
FIG. 1 illustrates exemplary Uplink (UL) communication in a general wireless communication system using beamforming according to an embodiment of the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a Mobile Station (MS) may be an electronic device.

FIG. 1 illustrates exemplary UpLink (UL) communication in a general wireless communication system using beamforming according to an embodiment of the present disclosure.

Referring to FIG. 1, for example, each of a Base Station (BS) 100 and an MS 105 uses a plurality of antenna beams. Specifically, as an example, the BS 100 is assumed to use N Reception (Rx) beams and the MS 105 is assumed to use M Transmission (Tx) beams. In UL transmission, the BS 100 receives a UL signal from the MS 105 by the N Rx beams, sequentially sweeping the Rx beams, Rx beam #1 to Rx beam #N. The MS 105 also transmits the UL signal by the M Tx beams, sequentially sweeping the Tx beams, Tx beam

1 to Tx beam #M. Among the Rx beams of the BS 100, an Rx beam closest to the Degree of Arrival (DoA) of the UL signal may receive the UL signal at a highest Signal to Noise Ratio (SNR) from the MS 105.

The MS 105 performs Random Access (RA) to transmit a UL signal to the BS 100. In general, an MS that is not connected to a BS performs RA to request resources to the BS. Thus, the MS 105 may be assumed to be powered on or attempting to access a network by handover. In this case, the MS 105 acquires DownLink (DL) synchronization through a DL Synchronization Channel (SCH), randomly selects an RA sequence code based on a UL transmission parameter acquired from a DL control channel, and transmits the selected RA sequence code to the BS 100. Then the BS 100 detects a Random Access Channel (RACH) of each MS based on an RA sequence code received from the MS and transmits, to the MS, power information, timing advance information, and the like for UL transmission of the MS on the detected RACH.

The MS 105 transmits a Physical Random Access Channel (PRACH) to the BS 100. If the MS 105 does not receive a response to the transmitted PRACH from the BS 100 for a predetermined time period, the MS 105 determines RACH detection of the BS 100 to be failed and the MS 105 retransmits the PRACH to the BS 100. The RA procedure is performed for network entry of an MS and minimizing a time taken from the PRACH transmission of the MS to the RACH detection of a BS is important. For example, an MS uses a PRACH to request access to a BS in an RA procedure in a Long Term Evolution (LTE) system. According to various embodiments of the present disclosure, the MS transmits the PRACH in a 1.08-MHz band (e.g., 6 Resource Blocks (RBs)), for transmission irrespective of a system bandwidth.

Figure 2:
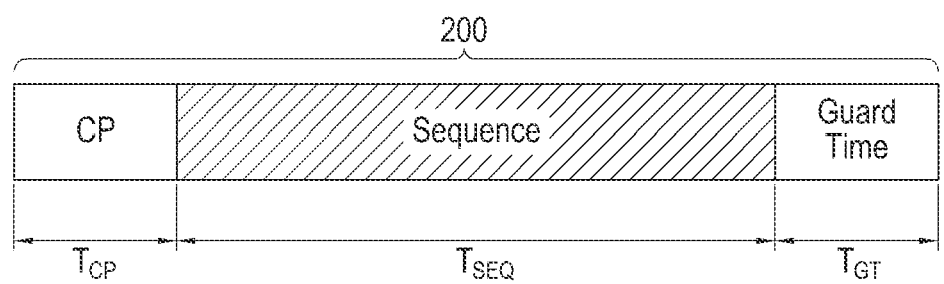
FIG. 2 illustrates an exemplary Physical Random Access Channel (PRACH) preamble in a general Long Term Evolution (LTE) communication system according to an embodiment of the present disclosure.

FIG. 2 illustrates an exemplary PRACH preamble in a general LTE communication system according to an embodiment of the present disclosure.

Referring to FIG. 2, a PRACH preamble 200 includes a Cyclic Prefix (CP) of length $T_{CP}$), a preamble sequence of length $T_{SEQ}$, and a guard time of length $T_{GT}$. According to various embodiments of the present disclosure, the length of the PRACH preamble 200, which is set by a higher-layer signal, is equal to the length of one subframe, $T_{Sub}$.

For example, the MS 105 may be assumed to transmit the PRACH preamble 200 illustrated in FIG. 2 to the BS 100. The BS 100 detects the PRACH preamble 200 by sequentially sweeping N Rx beams. According to various embodiments of the present disclosure, the legacy LTE PRACH preamble may be transmitted in one subframe. In this case, the BS 100 may not change an Rx beam during the duration of one subframe in order to detect the PRACH preamble. According to various embodiments of the present disclosure, in order for the BS 100 to determine a best Rx beam, the MS 105 should generally transmit as many PRACH preambles as the number of Rx beams in the BS 100. Throughout the specification, the best Tx beam or the best Rx beam may correspond to a beam carrying a signal having a maximum Tx or Rx signal strength. For example, the MS 105 transmits as many (herein N) PRACH signals as the number of Rx beams of the BS 100 by each Tx beam by sequentially sweeping the M Tx beams in Tx beamforming. Therefore, the MS 105 transmits N×M PRACH preambles in total. As a result, RA is delayed by a time corresponding to the total length of N×M subframes, thereby significantly degrading network performance.

Communication systems generally use a total bandwidth that is wider than the bandwidth of a PRACH. The remaining bandwidth except the bandwidth of the PRACH may be used for UL data transmission. As previously described, a BS should sequentially sweep all Rx beams to receive a PRACH signal. Thus, transmitting scheduled UL data, while receiving a PRACH signal may be difficult. As a consequence, resources are consumed and a UL data capacity is also decreased. Particularly, if MSs are not uniformly distributed across a cell, or if a very (e.g., and relatively) small number of MSs are located within the cell, PRACH transmission further decreases UL data transmission efficiency. Accordingly, transmitting only a PRACH during a PRACH transmission period in a wireless communication system using beamforming may be more efficient.

In this context, various embodiments of the present disclosure provide a slot structure designed to carry a UL RACH signal (hereinafter, referred to as a UL RACH slot) for minimizing an RA delay time in the process of determining the best Tx/Rx beam, and a method for receiving a UL RACH slot in a reception apparatus. Although the present disclosure is described in the context of a wireless communication system using beamforming in a millimeter wave communication system, by way of example, various embodiments of the present disclosure are also applicable to other communication systems. Specifically, various embodiments of the present disclosure provide a UL RACH slot in which the same RACH symbol occurs as many times as the number of Rx beams in a BS. An MS transmits a UL RACH slot of the present disclosure by each Tx beam. Then the BS detects RACH symbols in the UL RACH slot by sequentially sweeping Rx beams thereof for each Tx beam. For example, according to various embodiments of the present disclosure, the BS detects RACH symbols by all Rx beams during the duration of one UL RACH slot. Compared to a method of the related art for receiving an RACH signal by switching an Rx beam in each subframe, an RA time delay is significantly decreased. Because the UL RACH slot according to various of the present disclosure is an independent slot for RA only, without carrying UL data, a decrease in the capacity of UL data transmission may be minimized.

To assist with the understanding of various embodiments of the present disclosure, a frame structure to which a UL RACH slot configured according to various embodiments of the present disclosure will first be described below. For example, one frame is 5 ms long, and the frame may include 5 subframes each having a fixed length of 1 ms. Each subframe may be further divided into 20 slots each having a fixed length of 50 μs. Each slot may include 10 or 11 Orthogonal Frequency Division Multiplexing (OFDM) symbols. One OFDM symbol includes a Fast Fourier Transform (FFT) period and a CP period. For example, the FFT period may be 4 μs, and the CP may be 1 or 0.5μ. One OFDM symbol may be 5 or 4.5 μs long. Therefore, if one slot is 5 μs long, the slot may include 10 0.5-μs OFDM symbols.

For example, in a Frequency Division Duplexing (FDD) wireless communication system, a BS transmits at least one synchronization and Broadcast Channel (BCH) slot in each DL frame. Upon receipt of the synchronization and BCH slot, an MS acquires synchronization to the BS, receives system control information, and transmits control information in at least one control slot of each subframe. In addition, the BS transmits a DL training signal in at least one Beam Measurement (BM) slot of each frame. Each subframe carries user data in at least one data slot. While the system may select 10 or 11 OFDM symbols for a data slot, each of the other types of slots may always include 10 OFDM symbols. Likewise, there are a control slot, a BM slot, and a data slot for UL. According to various embodiments of the present disclosure, a UL RACH slot is used.

According to various embodiments of the present disclosure, a UL RACH symbol structure applicable to a wireless communication system using Tx beamforming and Rx beamforming is provided. According to various embodiments of the present disclosure, the UL RACH symbol may be assumed to be configured, for example, in the structure illustrated in FIG. 2. However, the lengths of fields included in the UL RACH symbol and the length of an RACH sequence are adjusted adaptively according to the wireless communication system to which the present disclosure is applied (e.g., the millimeter wave communication system as previously described). Specifically, the CP length $T_{CP}$ is equal to the length of three OFDM symbols, the RACH sequence length $T_{SEQ}$ is equal to the length of six OFDM symbols, and the guard time length $T_{GT}$ is equal to the remaining length of one UL RACH slot except for the CP and the RACH sequence. According to various embodiments of the present disclosure, the UL RACH sequence may be transmitted in a minimum bandwidth so that the UL RACH sequence may be detected irrespective of a system bandwidth. The UL RACH sequence may be generated based on a root index, root index u selected using a cell Identifier (ID), c (c=0, . . . , $N_{cell}$) estimated, for example, from a DL SCH in order to consider intra-cell interference or inter-cell interference. Herein, $N_{cell}$ is the number of cells. According to another example, root index u may be a random value smaller than the RACH sequence length. In this case, if the RACH sequence length is '1571', root index u ranges from 0 to 1570. To ensure a cross-correlation property irrespective of an MS-selected root index, the RACH sequence length is set to a prime number smaller than a 6 multiple of a minimum bandwidth. For example, if a minimum system bandwidth is 264 subcarriers, the RACH symbol length may be set to a prime number 1571 smaller than 1584. More MSs may be distinguished from one another by means of CP ⋎ to utilize the cross-correlation property of the RACH sequence.

Figure 3:
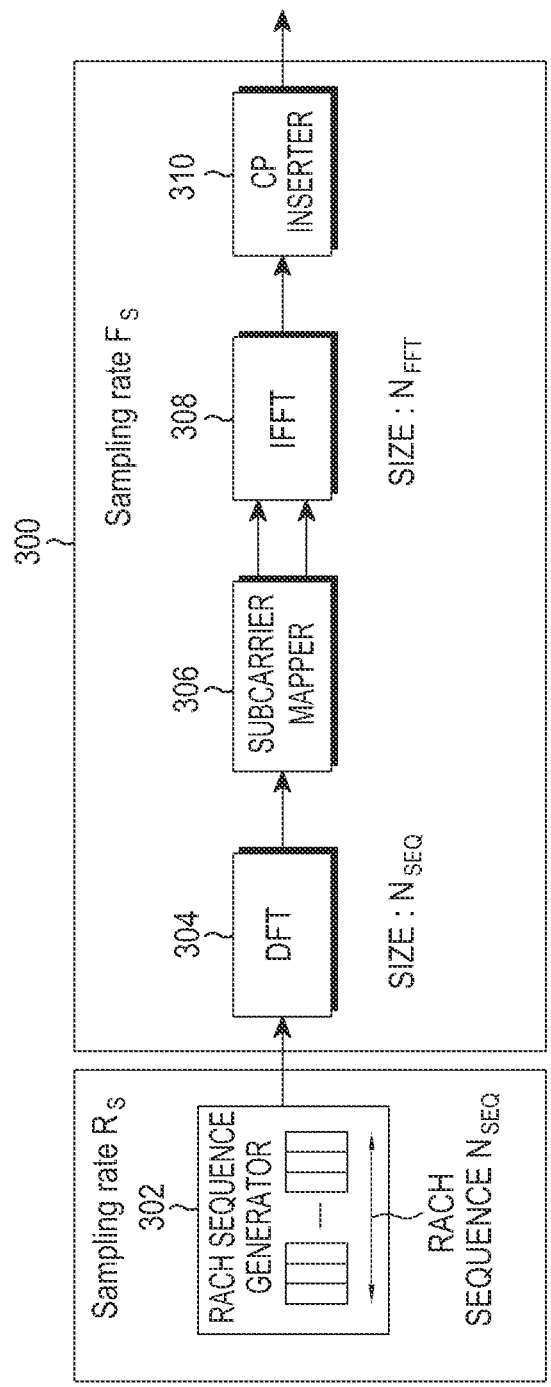
FIG. 3 is a block diagram of a transmission apparatus for transmitting a UL Random Access Channel (RACH) symbol according to an embodiment of the present disclosure.

FIG. 3 is a block diagram of a transmitter for transmitting a UL RACH symbol according to the first embodiment of the present disclosure.

Referring to FIG. 3, a transmitter 300 includes an RACH sequence generator 302, a Discrete Fourier Transform (DFT) processor 304, a subcarrier mapper 306, an Inverse Fast Fourier Transform (IFFT) processor 308, and a CP inserter 310.

The RACH sequence generator 302 generates the afore-described UL RACH sequence. The DFT processor 304 transforms the UL RACH sequence received from the RACH sequence generator 302 by DFT to reduce a Peak to Average Power ratio (PAPR). The DFT may be selectively performed. Accordingly, the subcarrier mapper 306 may receive the RACH sequence in a current state of the RACH sequence or the DFT-processed RACH sequence from the DFT processor 304.

The subcarrier mapper 306 allocates as many subcarriers as a minimum system bandwidth to the RACH sequence. As described before, the lengths of a CP and a guard time in a UL RACH symbol are adjusted, taking into account a total OFDM length of the UL RACH symbol. For example, the subcarrier mapper 306 sets a ⅙-subcarrier spacing so that 6 UL RACH symbols may correspond to 6 OFDM symbols.

The IFFT processor 308 processes the length-adjusted UL RACH symbol by IFFT. The CP inserter 310 inserts a CP in the IFFT RACH symbol received from the IFFT processor 308.

In detecting a UL RACH symbol according to the first embodiment of the present disclosure, a BS performs cross correlation in the time domain or in the frequency domain. The BS may acquire an RACH symbol and a timing between an MS and the BS by correlating the RACH symbol with respect to every root index. However, because a legacy RACH symbol is still used in the first embodiment of the present disclosure as previously described, problems associated with RA delay and decreased UL data capacity may still remain. Accordingly, another embodiment of the present disclosure provides a UL RACH slot structure that may overcome problems that may result from the UL RACH symbol structure according to the first embodiment of the present disclosure.

Figure 4:
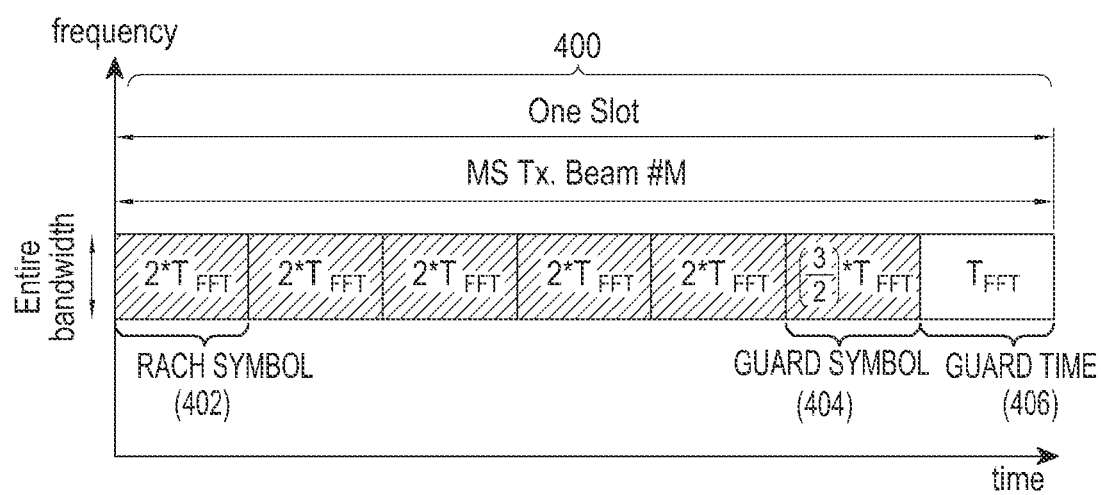
FIG. 4 illustrates a structure of a UL RACH slot according to embodiment of the present disclosure.

FIG. 4 illustrates an exemplary UL RACH slot structure according to an embodiment of the present disclosure.

Referring to FIG. 4, a UL RACH slot 400 is configured so as to include as many repeated afore-described UL RACH symbols as the total number of Rx beams of a BS. For example, the length of an RACH symbol 402 of the UL RACH slot 400 is equal to the length of two OFDM symbols, $2 \times T_{FFT}$ and the RACH symbol 402 occurs 5 times in the UL RACH slot 400. A CP-like guard symbol 404 is inserted in the UL RACH slot 400 to ensure signal continuity and a guard time 406 as long as one OFDM symbol is inserted in the UL RACH slot 400 in consideration of a propagation delay.

An RACH sequence including five RACH symbols 402 is allocated across a total system frequency band, compared to the RACH sequence configured according to the first embodiment of the present disclosure. Although there is a limit on the distance for which an RACH symbol may be transmitted, the RACH symbol may be configured to be shorter on the time axis. Therefore, the RACH symbol 402 may be repeated a plurality of times in one RACH slot 400. Meanwhile, according to various embodiments of the present disclosure, the service coverage of a wireless communication system considered may be 1 km or below. Consequently, the propagation distance limitation facing the RACH slot structure according to the second embodiment of the present disclosure does not matter much.

Figure 5:
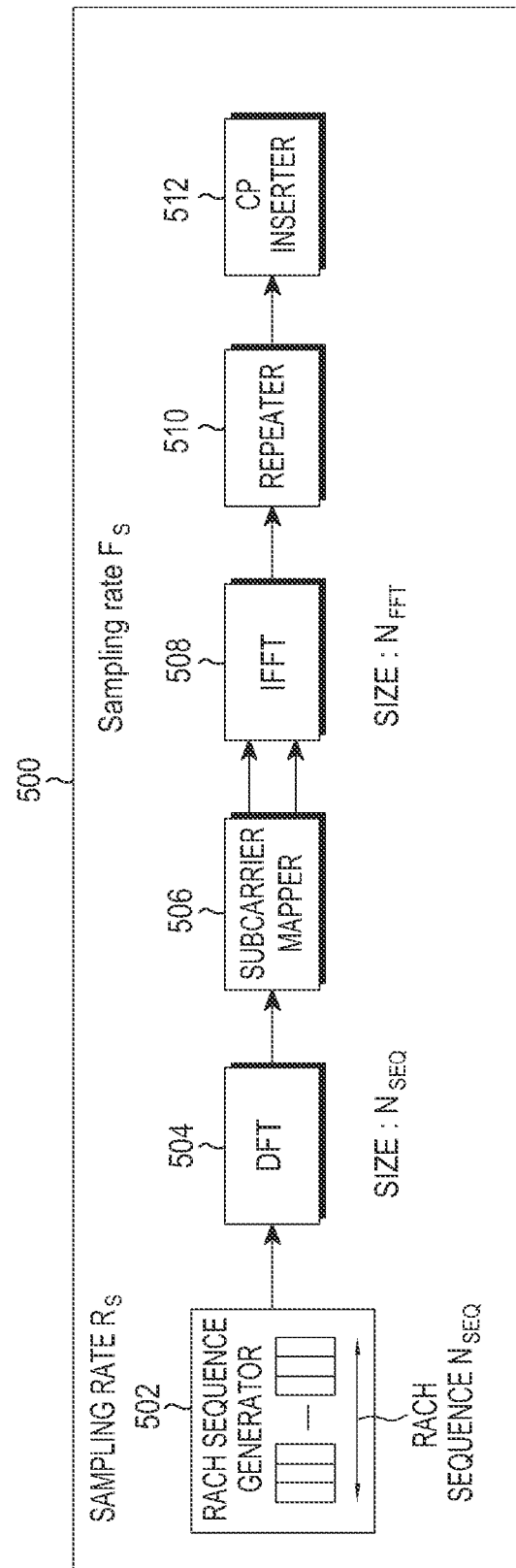
FIG. 5 is a block diagram of a transmission apparatus supporting the UL RACH slot structure according to the second embodiment of the present disclosure.

FIG. 5 is a block diagram of a transmission apparatus supporting the RACH slot structure according to the second embodiment of the present disclosure.

Referring to FIG. 5, a transmission apparatus 500 includes an RACH sequence generator 502, a DFT processor 504, a subcarrier mapper 506, an IFFT processor 508, a repeater 510, and a CP inserter 512. The RACH sequence generator 502, the DFT processor 504, and the CP inserter 512 operate in similar manners as the respective counterparts illustrated in FIG. 3 and discussed in relation thereto. Therefore, the RACH sequence generator 502, the DFT processor 504, and the CP inserter 512 will not be described herein in detail to avoid redundancy of description.

According to the second embodiment of the present disclosure, the RACH sequence generator 502 generates an RACH sequence in which the same symbol is repeated, as previously described.

Similar to the subcarrier mapper 306 of FIG. 3, the subcarrier mapper 506 adjusts the length of the RACH symbol by changing the spacing between RACH subcarriers. For example, the subcarrier mapper 506 may increase (e.g., doubles) the length of the RACH symbol 402 by reducing a subcarrier spacing allocated to the UL RACH slot 400 (e.g., reducing the subcarrier spacing allocated to the UL RACH slot 400 to a half). According to various embodiments of the present disclosure, the length $2 \times T_{FFT}$ of the RACH symbol 402 should be set in consideration of the length of a repetition pattern in the UL RACH slot 400. For example, the RACH symbol 402 occurs as many times as the total number of Rx beams in a reception apparatus, for example, five times through the repeater 510. The length of a guard time may be changed according to the repetition number and the length of an RACH symbol. To mitigate the problem of a decreased amount of UL data, the UL RACH slot includes only RACH symbols, without multiplexing the RACH symbols with UL data in the second embodiment of the present disclosure. Therefore, the RACH slot structure is relieved of the constraint imposed on multiplexing between an RACH symbol and an UL data symbol that the spacing between subcarriers allocated to the UL data symbol is set to an integer multiple of the subcarrier spacing of the RACH symbol. The DFT processor 504 performs DFT selectively as in the first embodiment of the present disclosure. According to various embodiments of the present disclosure, if DFT is performed, a PAPR is reduced.

Figure 6:
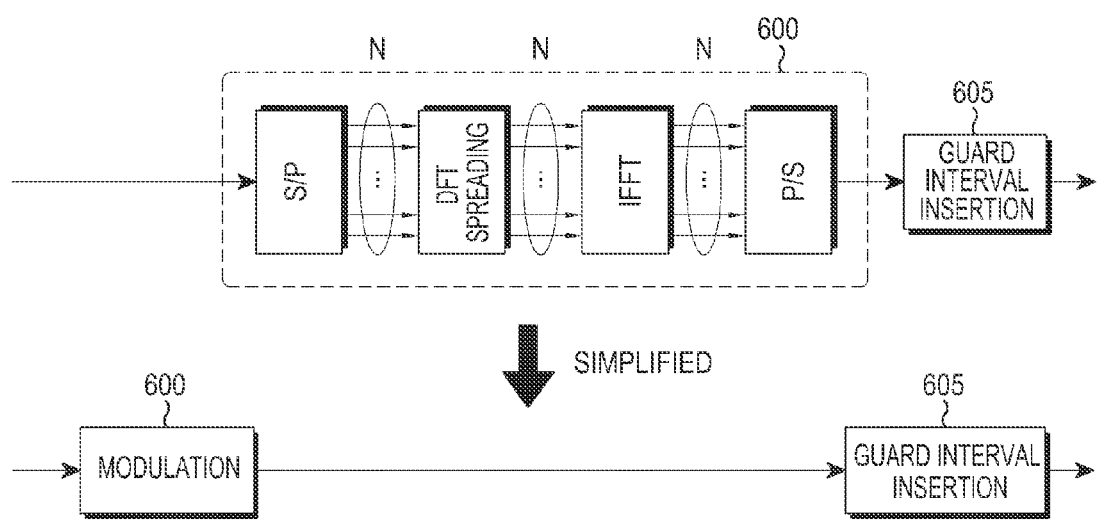
FIG. 6 is a diagram explaining a Peak to Average Power Ratio (PAPR) reduction effect of a UL RACH slot structure according to the first embodiment of the present disclosure.

FIG. 6 is a diagram explaining a PAPR reduction effect of the UL RACH slot structure according to the first embodiment of the present disclosure.

Referring to FIG. 6, modulation (including DFT spreading) of a UL RACH slot configured according to the first embodiment of the present disclosure leads to the effect of using total subcarriers of a system bandwidth for a single user in Orthogonal Frequency Division Multiple Access (OFDMA). For example, a transmission apparatus converts a serial RACH sequence to parallel RACH signals, DFT-spreads the parallel RACH signals, IFFT-processes the DFT-spread RACH signals to cancel the DFT spreading effect, and converts the parallel IFFT signals to a serial RACH signal, thus outputting the same type of signal as in a single carrier system at a modulation operation 600 before a guard interval insertion at operation 605. Therefore, if DFT is performed, an RACH slot according to the first embodiment of the present disclosure also has a low PAPR.

Figure 7:
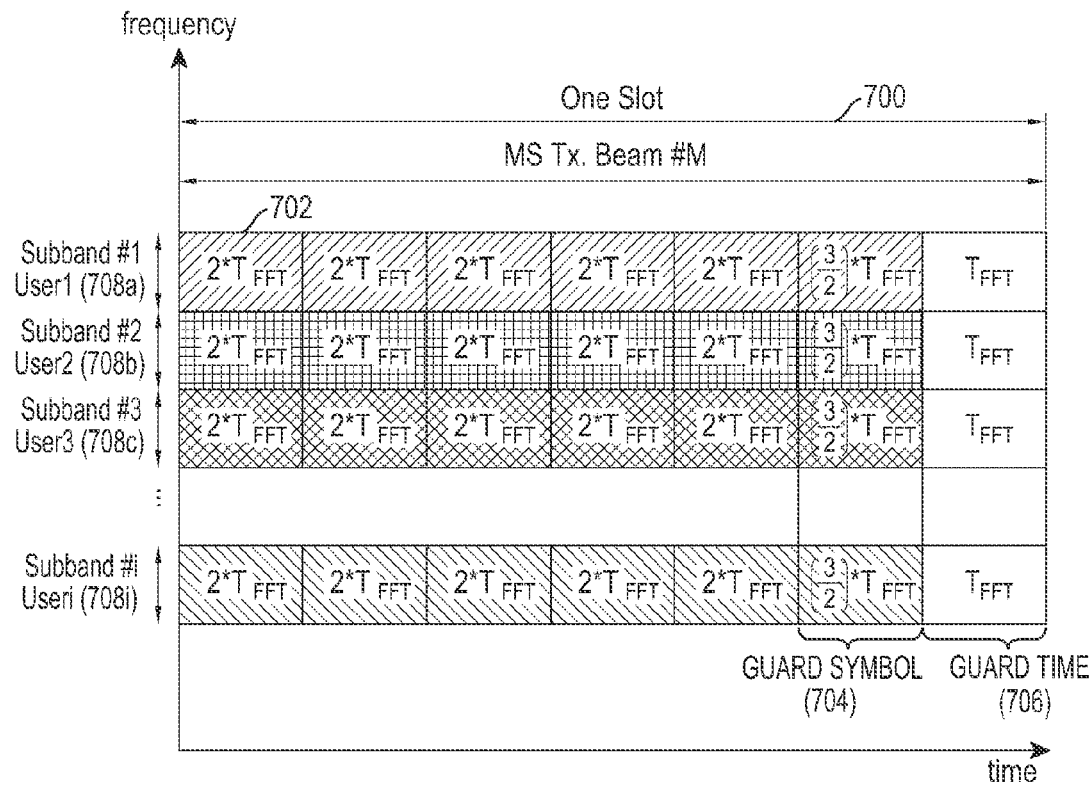
FIG. 7 illustrates a structure of a UL RACH slot according to a third embodiment of the present disclosure.

FIG. 7 illustrates a UL RACH slot structure according to a third embodiment of the present disclosure.

Referring to FIG. 7, a UL RACH slot 700 according to the third embodiment of the present disclosure is configured so that an RACH symbol occurs as many times as the total number of Rx beams of a reception apparatus in the UL RACH slot 700, as in the second embodiment of the present disclosure. For example, it is assumed that an RACH symbol 702 occurs five times in the UL RACH slot 700. The RACH symbol 702 is as long as two OFDM symbols. After the RACH symbol 702 occurs five times in the UL RACH slot 700, a guard symbol 704 serving as a CP is inserted to ensure signal continuity and a guard time 706 as long as one OFDM symbol is set in consideration of a propagation delay, in the UL RACH slot 700. In contrast to the second embodiment of the present disclosure, a UL RACH slot is configured in each of subbands 708a to 708i obtained by dividing a system bandwidth in the third embodiment of the present disclosure. The bandwidths of the subbands 708a to 708i may be equal or different. In the illustrated case of FIG. 7, the system bandwidth is divided into i subbands in total and i is determined based on the correlation property of an RACH sequence. According to various embodiments of the present disclosure, different MSs may configure RACH slots by allocating RACH symbols to the respective subbands 708a to 708i.

Although not shown, the UL RACH slot according to the third embodiment of the present disclosure is generated in the transmission apparatus illustrated in FIG. 5. Although the DFT processor 504 may be designed in correspondence with the total subcarriers of a system bandwidth in the second embodiment of the present disclosure, the DFT processor 504 may be designed in correspondence with the subcarriers of each of subbands forming a system bandwidth in the third embodiment of the present disclosure. Because multiple users use different subbands allocated thereto, resources may be allocated to the users in Distributed FDMA (DFDMA) or Localized FDMA (LFDMA) depending on how subcarriers are allocated to the multiple users in the third embodiment of the present disclosure. The DFT output of input data is distributed across a total band in DFDMA, whereas the DFT output of input data is allocated to contiguous subcarriers in LFDMA. For example, RACH symbols are allocated to each subband having contiguous subcarriers in LFDMA in FIG. 7.

In the third embodiment of the present disclosure, an RACH sequence is shorter than in the first embodiment of the present disclosure. Therefore, higher power may be allocated to allocated subcarriers, thus expanding service coverage. Furthermore, because an MS randomly selects a subband from among a plurality of subbands, another MS may compete with the MS for the same subband. However, a significant decrease in the probability of collision between RACH slots of different users, relative to the legacy RACH slot structure, may lead to reduction of interference caused by signals from adjacent MSs. As a result of a shortened RACH sequence, a spreading gain may be reduced. For example, a trade-off occurs between the length of an RACH sequence and a spreading gain. Accordingly, the length of an RACH sequence and the total number of subbands may be determined, taking into account reduction of a spreading gain and the Signal to Interference plus Noise Ratio (SINR) of an adjacent MS.

Figure 8:
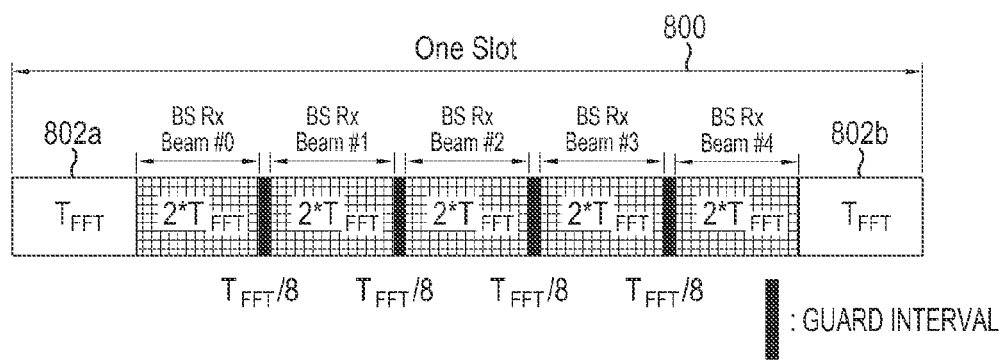
FIG. 8 illustrates an exemplary operation of Reception (Rx) beams in correspondence with a UL RACH slot structure during transmission of a UL RACH slot according to a fourth embodiment of the present disclosure.

FIG. 8 illustrates exemplary Rx beams operated in correspondence with a UL RACH slot structure during transmission of an UL RACH slot according to a fourth embodiment of the present disclosure.

Referring to FIG. 8, guard times 802a and 802b are set in the first and last symbol periods, taking into account of propagation delay in one slot 800 corresponding to an UL RACH slot. For the convenience of description, the length of each of the guard times 802a and 802b may be assumed to be equal to the length of one OFDM symbol in accordance with the UL RACH slot structures of the afore-described embodiments of the present disclosure. In addition, an MS may be assumed to transmit a UL RACH slot configured as illustrated in FIG. 7 according to the third embodiment of the present disclosure.

In this case, a BS may perform cross correlation, maintaining an Rx beam during the duration of one RACH symbol, $2 \times T_{FFT}$ in the UL RACH slot transmitted by the MS. Then the BS sequentially sweeps the five Rx beams of the BS for five RACH symbols included in the UL RACH slot. For example, the BS sequentially switches the Rx beam thereof from Rx beam #0 to Rx beam #4. Because the BS may not receive a signal during Rx beam switching, a guard interval of length $T_{FFT}/8$ shaded in FIG. 8 is allocated. Thus, the lengths of the first and last symbol periods (e.g., the lengths of the guard times 802a and 802b) may be changed, taking into account the lengths of the shaded guard intervals for Rx beam switching and the length of RACH symbols in the slot 800.

Figure 9:
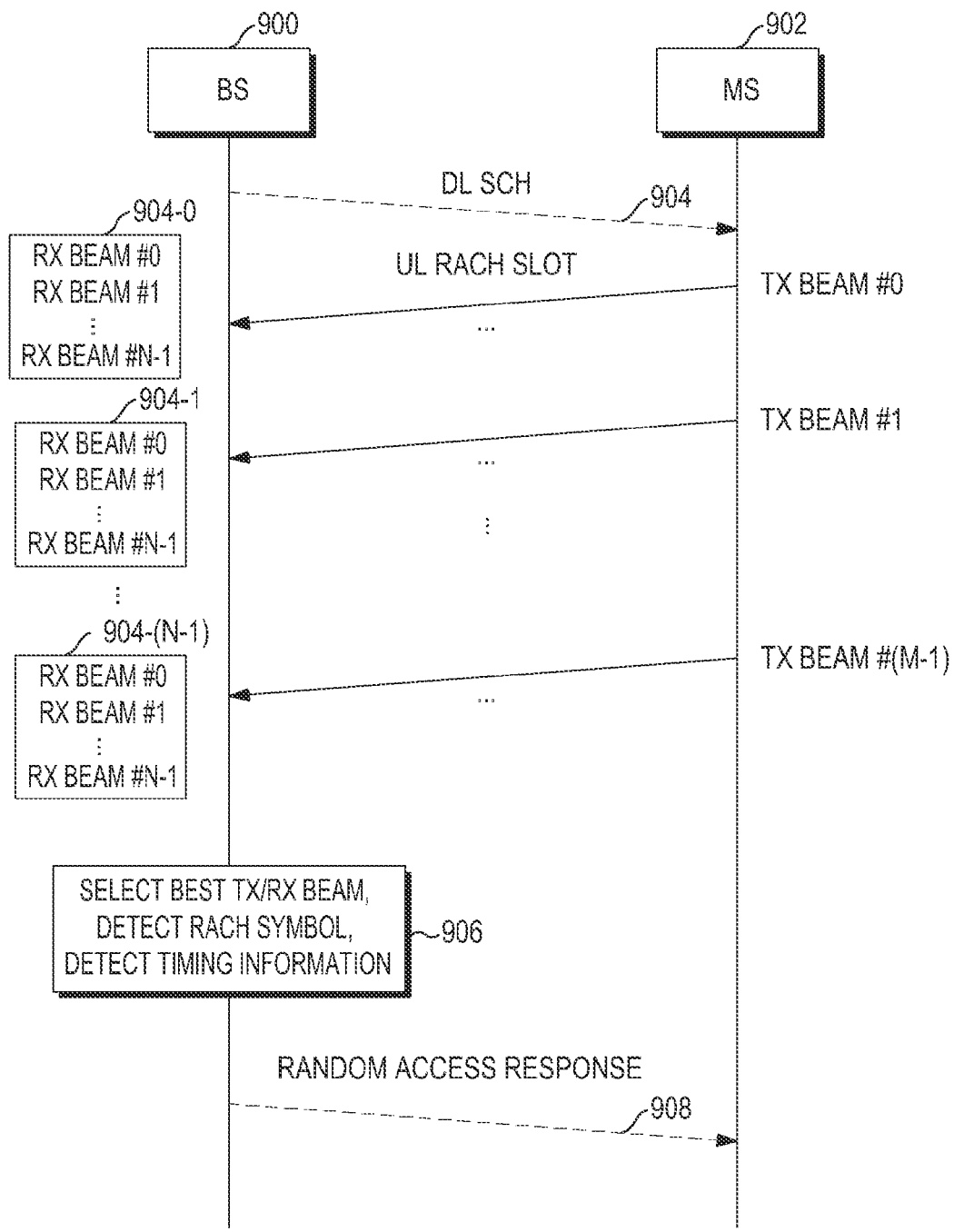
FIG. 9 is a diagram illustrating a signal flow for an Rx beam operation according to the fourth embodiment of the present disclosure.

FIG. 9 is a diagram illustrating a signal flow for an operation for using Rx beams according to the fourth embodiment of the present disclosure.

Referring to FIG. 9, a BS 900 may be assumed to use N Rx beams and an MS 902 may be assumed to use M Tx beams.

Referring to FIG. 9, at operation 904, the MS 902 receives a DL SCH from the BS 900. The MS 902 then transmits a UL RACH slot configured according to one of the first, second, and third embodiments of the present disclosure to the BS 900, while sequentially sweeping M Tx beams (e.g., by sequentially sweeping M Tx beams one by one).

If the MS 902 transmits the UL RACH slot by Tx beam #0, the BS 900 detects the UL RACH slot transmitted in Tx beam #0 by sequentially switching a Rx beam thereof to Rx beam #0 to RX beam #(N−1). According to one of the second and third embodiments of the present disclosure, the same RACH symbol occurs as many times as the total number of Rx beams of the BS 900 (e.g., N times). Accordingly, the BS 900 may detect the RACH symbols by all Rx beams during the duration of the UL RACH slot transmitted by Tx beam #0. Each time the BS 900 detects an RACH symbol by each Rx beam for one Tx beam, the BS 900 calculates the Power Delay Profile (PDP) of the RACH symbol, compares the PDP with a predetermined PDP threshold, and then determines the best Rx beam. The BS 900 detects UL RACH detection information indicating a Tx beam corresponding to the best Rx beam and the timing of the Tx beam and the best Rx beam. According to various embodiments of the present disclosure, at operation 906, the UL RACH detection information is determined after all UL RACH slots of M Tx beams are received, in FIG. 9.

According to another embodiment of the present disclosure that each time the BS 900 receives a UL RACH slot in each Tx beam of the MS 902, the BS 900 may determine the best Rx beam for the Tx beam and related UL RACH detection information and may transmit the UL RACH detection information to the MS 902.

For example, at operation 908, the BS 900 transmits the UL RACH detection information in a random access response to the MS 902. In the illustrated case of FIG. 9, when the BS 900 detects UL RACH detection information for all Tx beams of the MS 902, the BS 900 transmits all of the UL RACH detection information in the random access response to the MS 902. According to another embodiment of the present disclosure, each time the BS 900 detects UL RACH detection information for each Tx beam, the BS 900 transmits the UL RACH detection information in a random access response to the MS 902.

At operations 904-1 to 904-(M−1), the BS 900 respectively receives UL RACH slots transmitted in Tx beam #1 to Tx beam #(M−1) of the MS 902 in the same manner as at operation 904-0. The BS 900 may transmit a random access response including all of UL RACH detection information for all Tx beams to the MS 902 at operation 908, or the BS 900 may transmit UL RACH detection information for each Tx beam in a random access response to the MS 902, whenever the BS 900 detects the UL RACH detection information.

Consequently, a UL RACH slot configured in the second or third embodiment of the present disclosure reduces an RA time delay, compared to an RA time delay of (N×M) involved in a beamforming case according to the related art in which all Tx beams and all Rx beams are combined to determine a best Tx beam and a best Rx beam.

The operation for detecting an RACH symbol and a timing using an UL RACH slot received from an MS in a BS may be divided into a time-domain detection operation and a frequency-domain detection operation.

Figure 10:
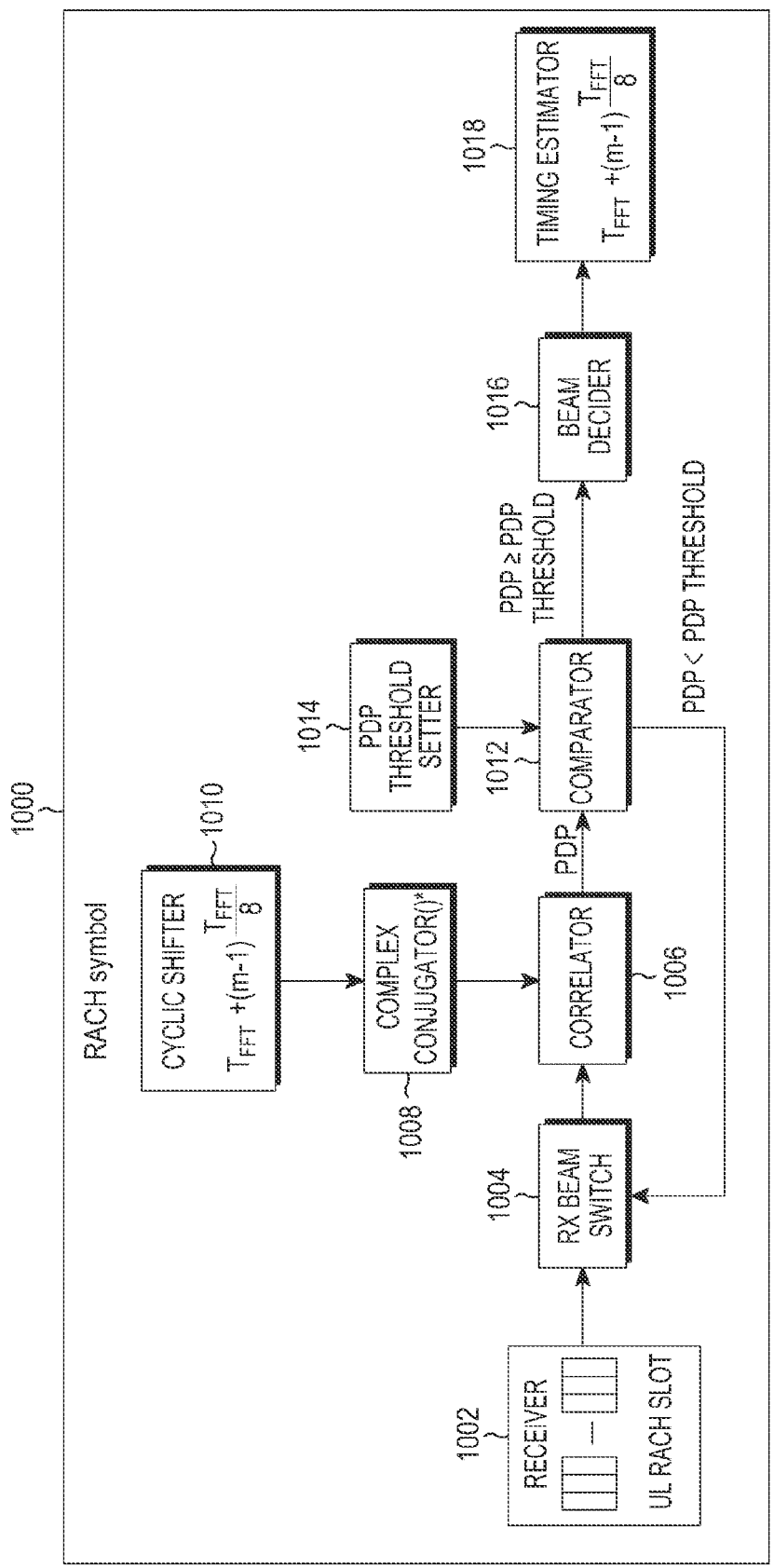
FIG. 10 is a block diagram of a reception apparatus for performing time-domain detection according to the fourth embodiment of the present disclosure.

FIG. 10 is a block diagram of a reception apparatus for time-domain detection according to the fourth embodiment of the present disclosure.

Referring to FIG. 10, as example, a UL RACH slot configured according to the second embodiment of the present disclosure may be assumed to be received. If the reception apparatus detects a UL RACH slot according to the third embodiment of the present disclosure, RACH symbols of multiple users are overlapped in the same time area and thus a signal from an MS may interfere with another adjacent MS.

Referring to FIG. 10, a BS 1000 includes a receiver 1002, an Rx beam switch 1004, a correlator 1006, a complex conjugator 1008, a cyclic shifter 1010, a comparator 1012, a PDP threshold setter 1014, a beam decider 1016, and a timing estimator 1018.

The receiver 1002 receives one UL RACH slot transmitted in each Tx beam of an MS.

The beam switch 1004 resets an Rx beam (e.g., sets an Rx beam to Rx beam #0) and receives the UL RACH slot in the Rx beam. While a signal corresponding to the duration of one RACH symbol is being received by Rx beam #0, the cyclic shifter 1010 cyclically shifts an RACH symbol pre-stored in a memory (not shown). For example, the cyclic shifter 1010 cyclically shifts an RACH symbol pre-stored in a memory (not shown) by a guard interval of length $T_{FFT}/8$ inserted for Rx beam switching illustrated in FIG. 8.

The complex conjugator 1008 generates an RACH symbol for cross correlation, (RACH symbol)* by complex conjugation of the cyclically shifted RACH symbol.

The correlator 1006 calculates the PDP of the RACH symbol received at the receiver 1002 by cross-correlating the RACH symbol received at the receiver 1002 with the complex-conjugated RACH symbol, (RACH symbol)*.

The comparator 1012 compares the calculated PDP with a PDP threshold set by the PDP threshold setter 1014. If the calculated PDP is equal to or larger than the PDP threshold, then the comparator 1012 indicates detection of an RACH symbol in the Rx beam to the beam decider 1016. Then the beam decider 1016 determines the Rx beam to be a best Rx beam. The timing estimator 1018 estimates a timing between the MS and the BS, for the best Rx beam.

In contrast, if the calculated PDP is smaller than the PDP threshold, then the comparator 1012 indicates non-detection of an RACH symbol in the Rx beam to the Rx beam switch 1004. Then the Rx beam switch 1004 switches the Rx beam to the next Rx beam, Rx beam #1 and repeats the operations of the correlator 1006 through the timing estimator 1018.

In the timing estimation operation, a reference time is changed each time an Rx beam is sequentially switched according to an embodiment of the present disclosure.

Figure 11:
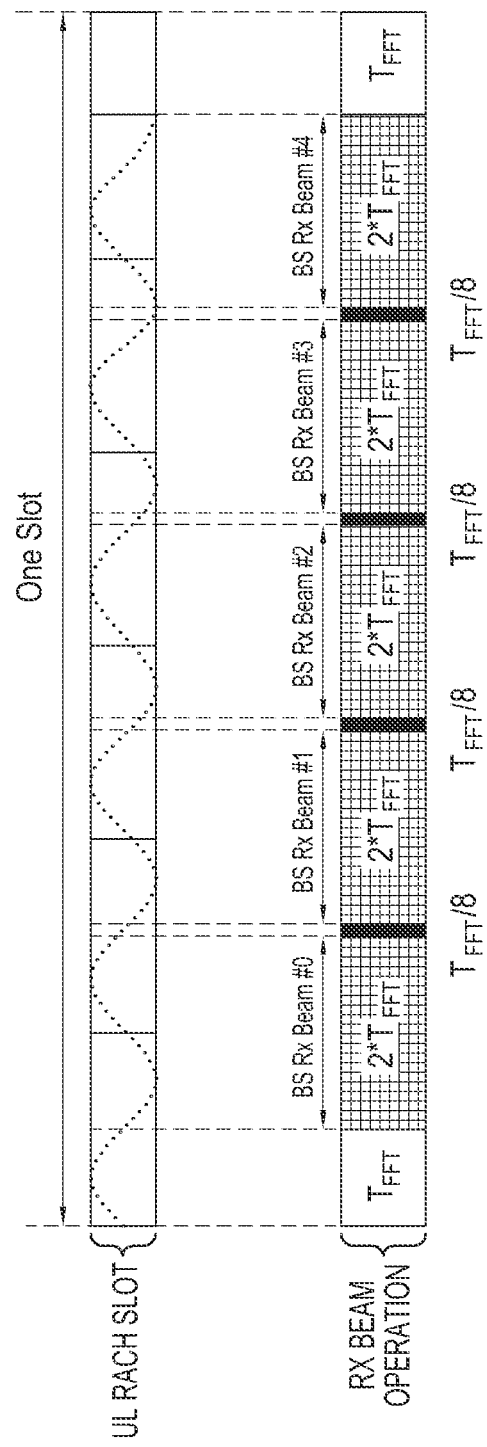
FIG. 11 illustrates a change in a reference time caused by Rx beam switching in a Base Station (BS) according to an embodiment of the present disclosure.

FIG. 11 illustrates a change in a reference time caused by Rx beam switching in a BS according to an embodiment of the present disclosure.

Referring to FIG. 11, the following description is provided under the assumption that the BS receives a UL RACH slot according to the second embodiment of the present disclosure and uses five Rx beams in total, by way of example.

Referring to FIG. 11, for example, as many repeated RACH symbols as the total number of Rx beams of the BS (e.g., five same RACH symbols occur in one received UL RACH slot). A time period during which the BS receives an RACH symbol by Rx beam #0 is set after a guard time of length $T_{FFT}$ set in consideration of propagation delay between the BS and the MS. If a timing error of δ occurs between the BS and the MS, a signal cyclically shifted by $T_{FFT}+\delta$ is received as an RACH symbol in Rx beam #0. For the convenience of description the propagation delay between the BS and the MS is assumed to be 0. Herein, the RACH symbol received by Rx beam #0 may have an inverse phase of an RACH symbol transmitted by the MS. When the BS receives an RACH symbol by Rx beam #1, the RACH symbol is cyclically shifted from the RACH symbol received by Rx beam #0 by a guard interval of length $T_{FFT}/8$. Thus, it may be concluded that a timing should be calculated, considering that an RACH symbol received by Rx beam #(M−1) is cyclically shifted from the RACH symbol received by Rx beam #0 by the product between the number of beam switchings and the guard interval, (m−1)$T_{FFT}/8$.

Figure 12:
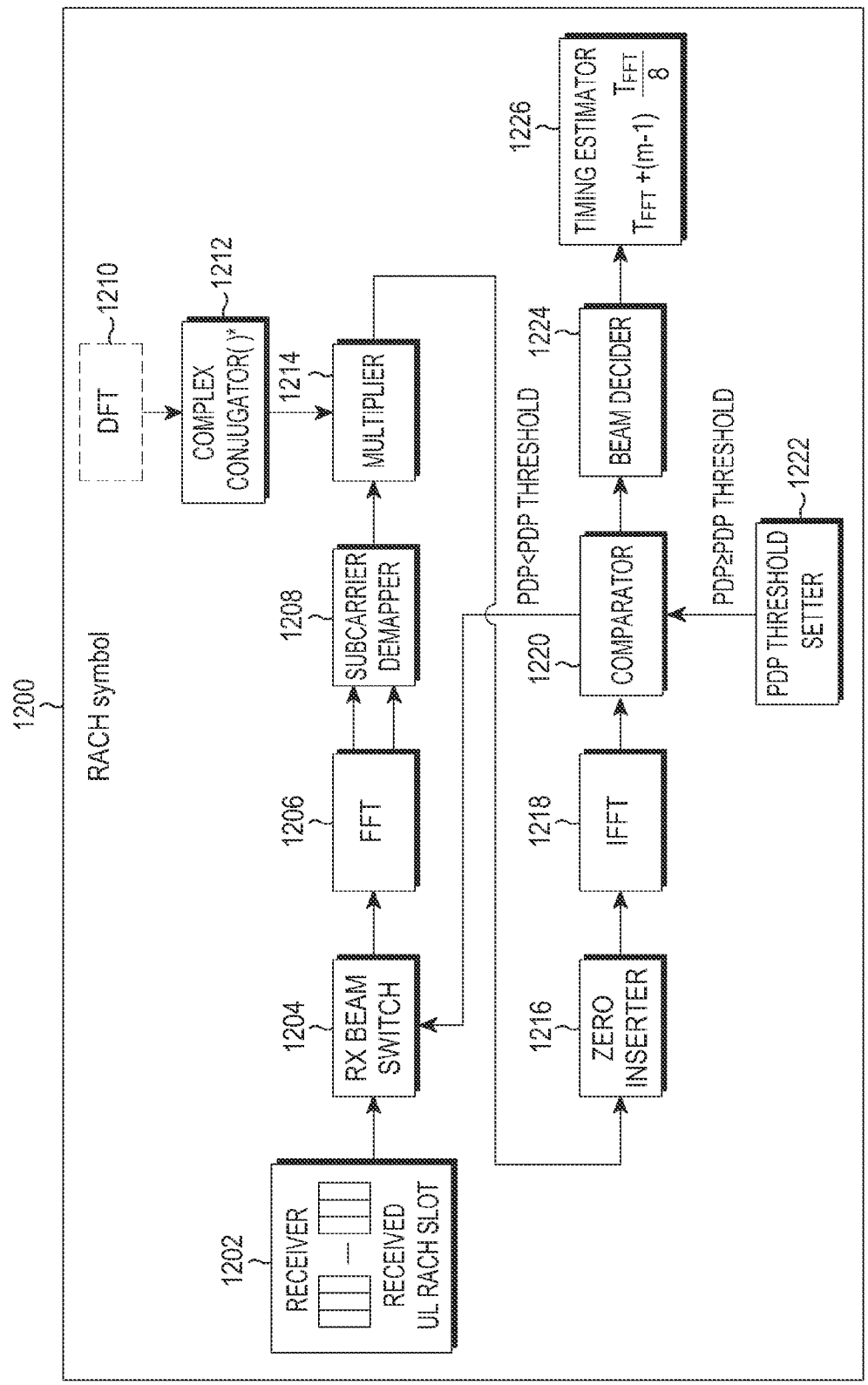
FIG. 12 is a block diagram of a reception apparatus for performing frequency-domain detection according to the fourth embodiment of the present disclosure.

FIG. 12 is a block diagram of a reception apparatus for performing frequency-domain detection according to the fourth embodiment of the present disclosure.

Referring to FIG. 12, the reception apparatus is assumed to receive a UL RACH slot according to the third embodiment of the present disclosure.

Referring to FIG. 12, a reception apparatus 1200 includes a receiver 1202, an Rx beam switch 1204, an FFT processor 1206, a subcarrier demapper 1208, a DFT processor 1210, a complex conjugator 1212, a multiplier 1214, a zero inserter 1216, an IFFT processor 1218, a comparator 1220, a PDP threshold setter 1222, a beam decider 1224, and a timing estimator 1226.

The receiver 1202 receives one UL RACH slot transmitted in each Tx beam of an MS.

The beam switch 1204 resets an Rx beam (e.g., sets an Rx beam to Rx beam #0) and receives the UL RACH slot in the Rx beam. A signal corresponding to the duration of one RACH symbol is received by Rx beam #0. The FFT processor 1211 converts the received RACH symbol to a frequency signal. According to the third embodiment of the present disclosure, RACH symbols of an MS are allocated to a subband obtained by dividing a total system band. Therefore, RACH symbols are mapped to subbands allocated thereto in a memory (not shown). The DFT processor 1210 performs DFT on subcarriers allocated to each subband, for the RACH symbols stored in the memory. If the transmission apparatus, (e.g., the MS) uses a DFT processor, then the DFT processor 1210 operates in correspondence with the DFT processor of the MS.

The complex conjugator 1212 complex-conjugates the DFT RACH symbol of each subband.

The multiplier 1214 multiplies subcarriers of the complex-conjugated RACH symbol by subcarriers allocated to an RACH symbol received from the subcarrier demapper 1208.

After the multiplication of subcarriers corresponding to the length of an RACH sequence included in the received UL RACH slot, the zero inserter 1216 inserts zero symbols for IFFT.

The IFFT processor 1218 IFFT-processes the zero symbol-inserted subcarriers. The resulting IFFT signals are equivalent to a cross-correlation result and thus a time-domain PDP is calculated.

The comparator 1220 compares the PDP received from the IFFT processor 1218 with a PDP threshold set by the PDP threshold setter 1222. If the received PDP is equal to or larger than the PDP threshold, then the comparator 1220 indicates detection of an RACH symbol in the Rx beam to the beam decider 1224. Then the beam decider 1224 determines the Rx beam to be a best Rx beam.

The timing estimator 1226 estimates a timing between the MS and the BS, for the best Rx beam.

In contrast, if the received PDP is smaller than the PDP threshold, then the comparator 1220 indicates non-detection of an RACH symbol in the Rx beam to the Rx beam switch 1204. Then the Rx beam switch 1204 switches the Rx beam to the next Rx beam, Rx beam #1 and the subsequent operations are repeated for Rx beam #1.

Figure 13:
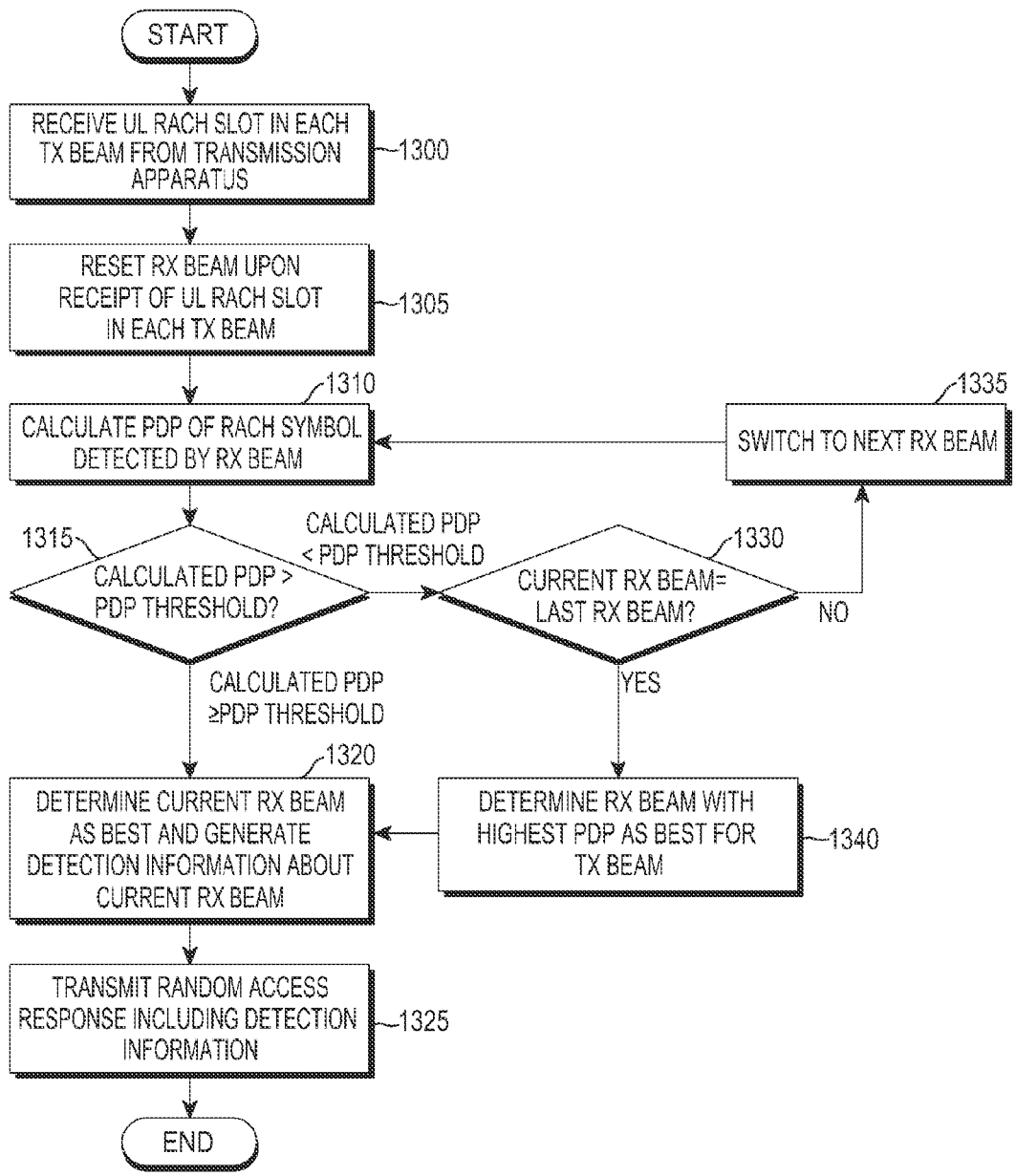
FIG. 13 is a flowchart illustrating an operation for receiving a UL RACH slot in a reception apparatus according to embodiments of the present disclosure.

FIG. 13 is a flowchart illustrating an operation for receiving a UL RACH slot in a reception apparatus according to embodiments of the present disclosure.

Referring to FIG. 13, the reception apparatus and a transmission apparatus are assumed to have already completed procedures required for performing RA to transmit a UL signal, described before with reference to FIG. 1, for example, a DL SCH acquisition procedure, and the like.

Referring to FIG. 13, at operation 1300, the reception apparatus receives a UL RACH slot transmitted in each Tx beam by the transmission apparatus. The UL RACH slot includes as many repeated RACH symbols as the total number of Rx beams used in the reception apparatus.

Operations 1305 through 1340 are performed in the same manner for each Tx beam in the reception apparatus. For the convenience of description, Operations 1305 through 1340 will be described for one Tx beam.

At operation 1305, upon receipt of a UL RACH slot transmitted in a Tx beam by the transmission apparatus, the reception apparatus resets an Rx beam.

At operation 1310, the reception apparatus calculates the PDP of an RACH symbol detected by the reset Rx beam during the duration of a UL RACH slot.

At operation 1315, the reception apparatus compares the calculated PDP with a PDP threshold.

If the calculated PDP is equal to or larger than the PDP threshold, then the reception apparatus proceeds to operation 1320 at which the reception apparatus determines the current Rx beam to be a best Rx beam and generates detection information about the current Rx beam. For example, the generated detection information may include information about a timing between the reception apparatus and the transmission apparatus, at which the UL RACH symbol is transmitted and information about the Tx beam by which the RACH symbol detected in the current Rx beam is transmitted.

At operation 1325, the reception apparatus transmits a random access response including the detection information to the MS.

According to various embodiments of the present disclosure, the operation for generating detection information and the operation for transmitting a random access response to the transmission apparatus may be performed for each UL RACH slot received by a Tx beam or may be performed once after UL RACH slots are received by all Tx beams as illustrated in FIG. 9.

In contrast, if the calculated PDP is smaller than the PDP threshold at operation 1315, then the reception apparatus proceeds to operation 1330 at which the reception apparatus determines whether the current Rx beam is the last Rx beam of the receiver.

If the reception apparatus determines that the current Rx beam is not the last Rx beam at operation 1330, then the reception apparatus may proceed to operation 1335 at which the reception apparatus switches to the next Rx beam. Thereafter, the reception apparatus returns to operation 1310.

In contrast, if the reception apparatus determines that the current Rx beam is the last Rx beam at operation 1330, then the reception apparatus may proceed to operation 1340 at which the reception apparatus determines an Rx beam having the highest of the PDPs of RACH symbols detected from a corresponding Tx beam to be a best Rx beam. Thereafter, the reception apparatus returns to operation 1320 at which the reception apparatus generates detection information about the determined best Rx beam. Thereafter, the reception apparatus proceeds to operation 1325.

Figure 14:
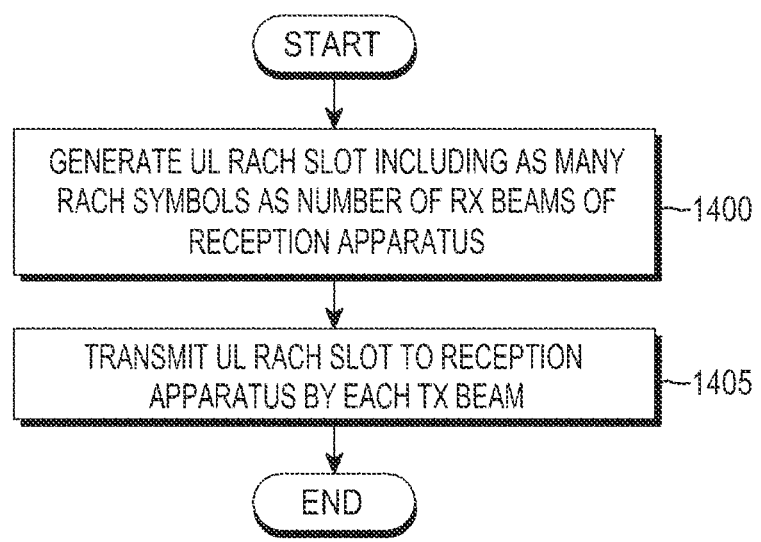
FIG. 14 is a flowchart illustrating an operation for transmitting a UL RACH slot in a transmission apparatus according to embodiments of the present disclosure.

FIG. 14 is a flowchart illustrating an operation for transmitting a UL RACH slot in a transmission apparatus according to embodiments of the present disclosure.

Referring to FIG. 14, at operation 1400, the transmission apparatus generates a UL RACH slot according to the afore-described second or third embodiment of the present disclosure. In the UL RACH slot, the same RACH symbol occurs as many times as the number of Rx beams used in a reception apparatus. If the UL RACH slot is generated according to the third embodiment of the present disclosure, the transmission apparatus divides a total system bandwidth into subbands for multiple users and allocates an RACH symbol for each user to the subband allocated to the user. The detailed configurations of an UL RACH slot according to the second and third embodiments of the present disclosure have been described before and thus will not be described again herein.

At operation 1405, the transmission apparatus transmits the UL RACH slot to the reception apparatus by each of its Tx beams.

Then the transmission apparatus receives detection information about a best Rx beam for each Tx beam from the reception apparatus. The detection information about the best Rx beam for each Tx beam may be received after UL RACH slots are transmitted by all of the Tx beams or each time a UL RACH slot is transmitted by one Tx beam.

According to various embodiments of the present disclosure, the method and apparatus for transmitting and receiving a UL RACH slot in a wireless communication system using beamforming may be implemented as computer-readable code in a non-transitory computer-readable recording medium. The non-transitory computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and/or the like, and may also include the medium that is implemented in the form of carrier waves (e.g., transmission over the Internet). In addition, the non-transitory computer-readable recording medium may be distributed over the computer systems connected over the network, and computer-readable codes may be stored and executed in a distributed manner.

As is apparent from the foregoing description, because a BS detects RACH symbols by sequentially sweeping Rx beams thereof one by one during the duration of a UL RACH slot in correspondence with a UL RACH slot structure according to various embodiments of the present disclosure, a time delay is reduced, compared to a scheme according to the related art in which RACH symbols are detected by sweeping one Rx beam per subframe. Furthermore, the UL RACH slot of the present disclosure is an independent slot for RA, without carrying UL data. Therefore, a decrease in the capacity of UL data transmission is minimized.

While the present disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for receiving a signal by a base station in a wireless communication system, the method comprising:
    transmitting a synchronization signal and control information for uplink transmission;
    receiving a random access signal transmitted through at least one transmission beam of a mobile station by switching a plurality of reception beams of the base station, the random access signal comprising a plurality of symbols corresponding to a number of the plurality of reception beams;
    detecting a symbol corresponding to each of the plurality of reception beams from the plurality of symbols comprised in the random access signal; and
    if a signal strength of the detected symbol is equal to or larger than a predetermined threshold, transmitting, to the mobile station, information related to a reception beam corresponding to the detected symbol among the plurality of reception beams.

2. The method of claim 1, wherein the random access signal is allocated to a total frequency band allocated to the wireless communication.

3. The method of claim 1, wherein the random access signal is allocated to one of subbands obtained by dividing a total frequency band,
    wherein other subbands are allocated to random access signals transmitted by other mobile stations.

4. The method of claim 1, wherein the transmitting of the information related to the reception beam comprises:
    determining the reception beam as a best reception beam if the signal strength of the detected symbol is equal to or larger than the predetermined threshold.

5. The method of claim 1, wherein the detecting of the symbols further comprises:
    if the signal strength of the detected symbol is smaller than the predetermined threshold, comparing a signal strength of a detected next symbol corresponding to a next reception beam of the reception beam with the predetermined threshold.

6. A non-transitory computer-readable storage medium storing instructions that, when executed, cause at least one processor to perform the method of claim 1.

7. A base station for receiving a signal in a wireless communication system, the base station comprising:
    a transceiver configured to transmit a synchronization signal and control information for uplink transmission, and receive a random access signal through at least one transmission beam of a mobile station by switching a plurality of reception beams of the base station, the random access signal comprising a plurality of symbols corresponding to a number of the plurality of reception beams; and
    a controller configured to:
        detect a symbol corresponding to each of the plurality of reception beams from the plurality of symbols comprised in the random access signal, and
        if a signal strength of the detected symbol is equal to or larger than a predetermined threshold, control the transceiver to transmit, to the mobile station, information related to a reception beam corresponding to the detected symbol among the plurality of reception beams.

8. The base station of claim 7, wherein the random access signal is allocated to a total frequency band allocated to the wireless communication.

9. The base station of claim 7,
wherein the random access signal is allocated to one of subbands obtained by dividing a total frequency band, and
wherein other subbands are allocated to the respective subbands, the subbands to which the signal is not allocated are allocated to random access signals transmitted by other mobile stations.

10. The base station of claim 7, wherein the controller is further configured to:
determine the reception beam as a best reception beam if the signal strength of the detected symbol is equal to or larger than the predetermined threshold.

11. The base station of claim 7, wherein if the signal strength of the detected symbol is smaller than the predetermined threshold, the controller is further configured to compare a signal strength of a detected next symbol corresponding to a next reception beam of the reception beam with the threshold.

12. A method for transmitting a signal by a mobile station in a wireless communication system, the method comprising:
receiving, from a base station, a synchronization signal and control information for uplink transmission;
generating a random access signal based on the control information, the random access signal comprising a plurality of symbols corresponding to a number of a plurality of reception beams of the base station;
transmitting, to the base station, the random access signal through at least one transmission beam of the mobile station; and
receiving, from the base station, information related to a reception beam corresponding to a detected symbol among the plurality of reception beams, wherein a signal strength of the detected symbol is equal to or larger than a predetermined threshold.

13. The method of claim 12, wherein the random access signal is allocated to a total frequency band allocated to the wireless communication.

14. The method of claim 12, wherein the generating of the random access signal comprises:
inserting a guard interval between the plurality of symbols, taking into account a switching time between the plurality of reception beams at the base station.

15. A non-transitory computer-readable storage medium storing instructions that, when executed, cause at least one processor to perform the method of claim 12.

16. The method of claim 12,
wherein the random access signal is allocated to one of subbands obtained by dividing a total frequency band, and
wherein other subbands are allocated to random access signals transmitted by other mobile stations.

17. A mobile station for transmitting a signal in a wireless communication system, the mobile station comprising:
a transceiver configured to receive, from a base station, a synchronization signal and control information for uplink transmission; and
a controller configured to:
generate a random access signal based on the control information, the random access signal comprising a plurality of symbols corresponding to a number of a plurality of reception beams of the base station, and
control the transceiver to transmit the random access signal to the base station through at least one transmission beam of the mobile station,
wherein the transceiver receives, from the base station, information related to a reception beam corresponding to a detected symbol among the plurality of reception beams, wherein a signal strength of the detected symbol is equal to or larger than a predetermined threshold.

18. The mobile station of claim 17, wherein the random access signal is allocated to a total frequency band allocated to the wireless communication.

19. The mobile station of claim 17, wherein the controller is further configured to insert a guard interval between the plurality of symbols, taking into account a switching time between the plurality of reception beams at the base station.

20. The mobile station of claim 17,
wherein the random access signal is allocated to one of subbands obtained by dividing a total frequency band, and
wherein other subbands are allocated to random access signals transmitted by other mobile stations.

* * * * *